United States Patent [19]
Shibaike et al.

[11] Patent Number: 5,321,565
[45] Date of Patent: Jun. 14, 1994

[54] RECORDING/REPRODUCING APPARATUS HAVING PLURAL SLIDING CHASSIS FOR COMPACT CONFIGURATION

[75] Inventors: Narito Shibaike, Hirakata; Satoshi Matsumoto, Kobe; Satoshi Kikuya, Hirakata, all of Japan

[73] Assignee: Matsushita Electric Industrial Co., Ltd., Kadoma, Japan

[21] Appl. No.: 866,017

[22] Filed: Apr. 8, 1992

[30] Foreign Application Priority Data

Apr. 10, 1991 [JP] Japan .................. 3-077526

[51] Int. Cl.⁵ ............................. G11B 5/027
[52] U.S. Cl. ........................ 360/85; 360/96.5
[58] Field of Search ............ 360/965, 95, 85, 96.6; 242/198

[56] References Cited

U.S. PATENT DOCUMENTS

| | | | |
|---|---|---|---|
| 4,517,613 | 5/1985 | Shibaike et al. | |
| 4,614,991 | 9/1986 | Murakami | 360/96.5 |
| 4,789,912 | 12/1988 | Masuda et al. | 360/85 |
| 4,803,574 | 2/1989 | Konishi et al. | 360/85 |
| 4,933,790 | 6/1990 | Mitumaru | 360/96.5 |
| 4,985,789 | 1/1991 | Kodama et al. | 360/85 |
| 5,124,854 | 6/1992 | Iyota et al. | 360/96.6 |

FOREIGN PATENT DOCUMENTS

| | | |
|---|---|---|
| 0232161 | 8/1987 | European Pat. Off. |
| 0310114 | 4/1989 | European Pat. Off. |
| 0394975 | 10/1990 | European Pat. Off. |
| 0431620 | 6/1991 | European Pat. Off. |
| 0449658 | 10/1991 | European Pat. Off. |
| 3701159 | 7/1987 | Fed. Rep. of Germany |
| 62-180551 | 8/1987 | Japan |
| 8493790 | 9/1984 | PCT Int'l Appl. |

Primary Examiner—A. J. Heinz
Assistant Examiner—Brian E. Miller
Attorney, Agent, or Firm—Cushman, Darby & Cushman

[57] ABSTRACT

In a recording/reproducing apparatus, a first support frame (22) supports a tape cassette (1), a second support frame (23) supports a tape guide drum (9) and loading rings (29), (30), (16), (17), and a third support frame (24) slidably supports the first support frame (22) and the second support frame (23). In a cassette loading operation, when the first support means (22) approaches the second support means (23) for a predetermined interval, a predetermined tape path is established by various loading posts, the tape guide drum (9) and the like. Then, the first support means (22) and the second support means (23) are slid together on the third support means (24) to be received compactly in the apparatus.

11 Claims, 17 Drawing Sheets

RECORDING/REPRODUCING APPARATUS HAVING PLURAL SLIDING CHASSIS FOR COMPACT CONFIGURATION

FIELD OF THE INVENTION AND RELATED ART STATEMENT

1. Field of the Invention

The present invention relates to a recording/reproducing apparatus, such as a video cassette recorder (hereinafter abbreviated as VCR) or a digital audio tape recorder (DAT) for recording and reproducing video signals and/or audio signals of a tape cassette which is to be loaded into the recording/reproducing apparatus. The recording/reproducing apparatus records and/or reproduces such signals by drawing a part of tape from the tape cassette into an operating position, and moving it in a predetermined tape path so as to be wound around a tape guide drum.

2Description of the Related Art

In recent years, many VCRs have come into wide use as a recording/reproducing apparatus. In the VCR, especially a portable VCR incorporated with a camera unit in one body, a user is expecting that such a VCR is configured to be small-sized and light-weight. Therefore, it is very important to develop a small-sized and light-weight VCR.

In such a VCR, it is indispensable for recording and/or reproducing audio and/or video to automatically draw a part of the tape from a tape cassette, and to wind the drawn-out tape around a tape guide drum, so that the tape is disposed on a predetermined tape path defined by various loading posts and the like. Therefore, planar size of such a VCR is almost determined by the diameter of the tape guide drum, the dimensions of the receiving space for the path-forming means, and the dimensions of the tape cassette.

Recently, in order to achieve a small-size and light-weight VCR, some portable VCRs have been designed to have a tape guide drum inserted into a front opening of the tape cassette when the tape is wound around the tape guide drum. Further, some portable VCRs are designed to slide an outer case of the VCR toward an inner space where the tape has passed for winding around the tape guide drum. Example of such a conventional VCR as a recording/reproducing apparatus is shown in the Japanese published examined patent application No. sho 62-180551 (Tokkou Sho 62-180551) which was filed by the same assignee.

In the conventional recording/reproducing apparatus, when the stretched tape in the tape cassette is wound around the tape guide drum to form a predetermined tape path, the loaded tape cassette and the tape guide drum provided in the apparatus are moved close to each other, and the outer case of the apparatus is slid open. Therefore, the conventional recording/reproducing apparatus is disadvantageous in that complicated mechanisms for the loading operation of the tape cassette and for the sliding operation of the outer case must be provided in the apparatus. As a result, it has been difficult to configure the conventional recording/reproducing apparatus to be small-size and light-weight.

OBJECT AND SUMMARY OF THE INVENTION

It is an object of the present invention to provide a recording/reproducing apparatus which is small-sized and light-weight, and which has a simple mechanism for loading a tape cassette.

In order to achieve the above-mentioned object, the recording/reproducing apparatus of the present invention comprises:

a first support means for supporting a tape cassette, a second support means for supporting a tape guide drum which has at least one rotary head, a third support means for supporting the first support means and the second support means, a first movement means which moves the first support means to approach in a first direction in relation to the second support means, and a second movement means which makes the second support means move in the first direction in relation to the third support means.

In another embodiment, the recording/reproducing apparatus of the present invention comprises:

a first support means for supporting a tape cassette, a second support means for supporting a tape guide drum which has at least one rotary head, a first movement means which makes the first support means approach the second support means, a third support means for receiving the first support means and the second support means, and a turn-over cover which covers tightly the third support means, and of which a turning movement links with the first support means and the second support means to be received by the third support means.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Hereafter, a first embodiment of a recording/reproducing apparatus, such as a portable VCR, etc., of the present invention is described referring to the accompanying drawings of FIGS. 1 to 9.

Figure 1:
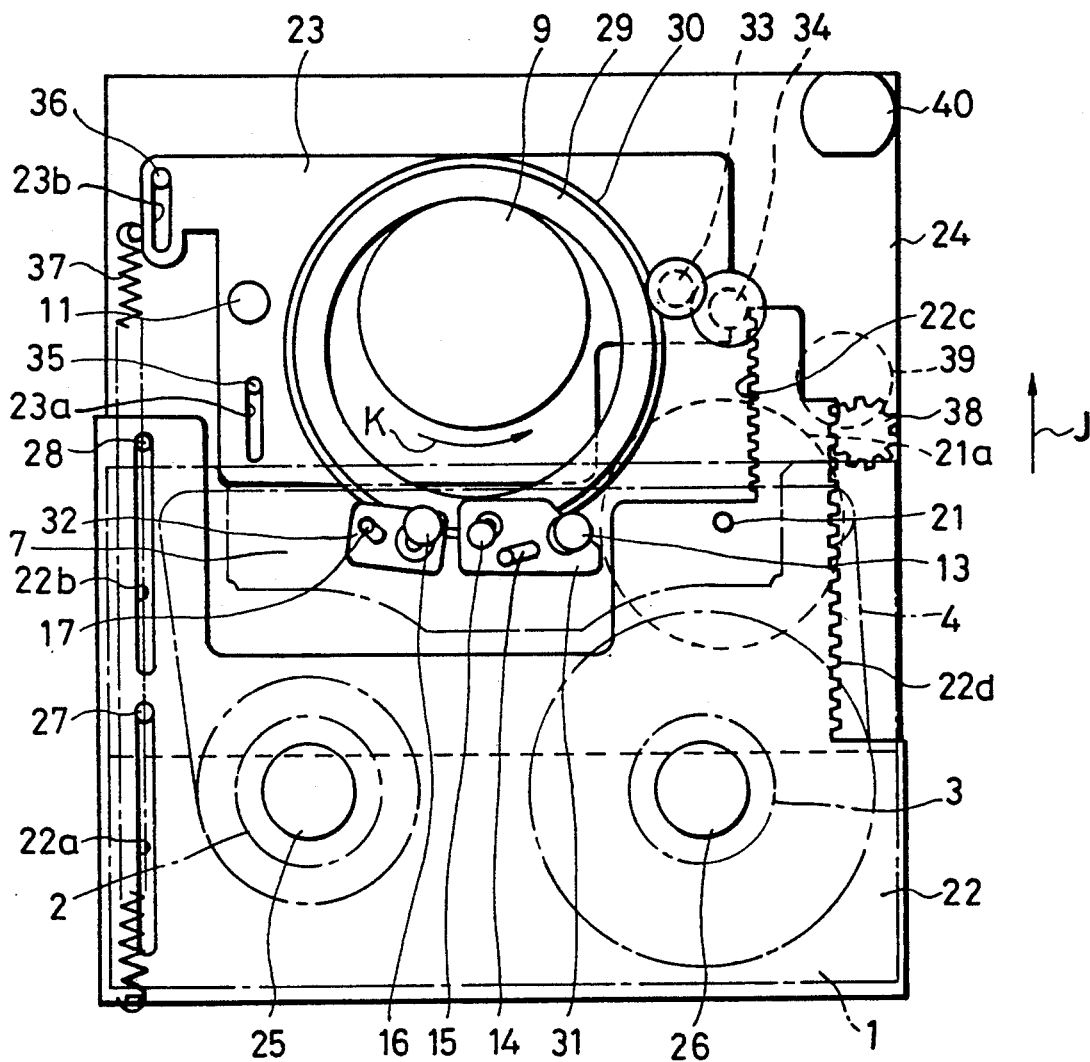
FIG. 1 to FIG. 3 are plan views showing main parts of a loading mechanism of a recording/reproducing apparatus of a first embodiment in accordance with the present invention.
Figure 2:
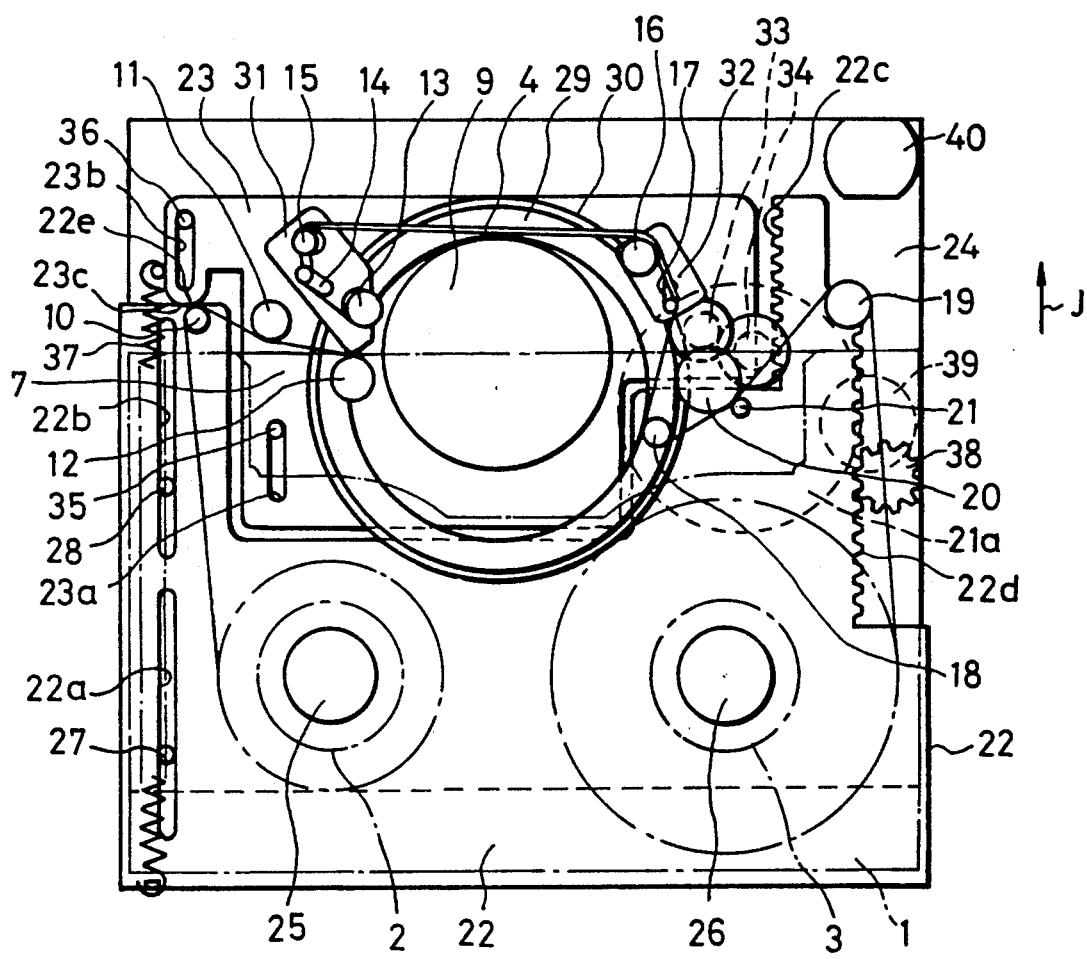
Figure 3:
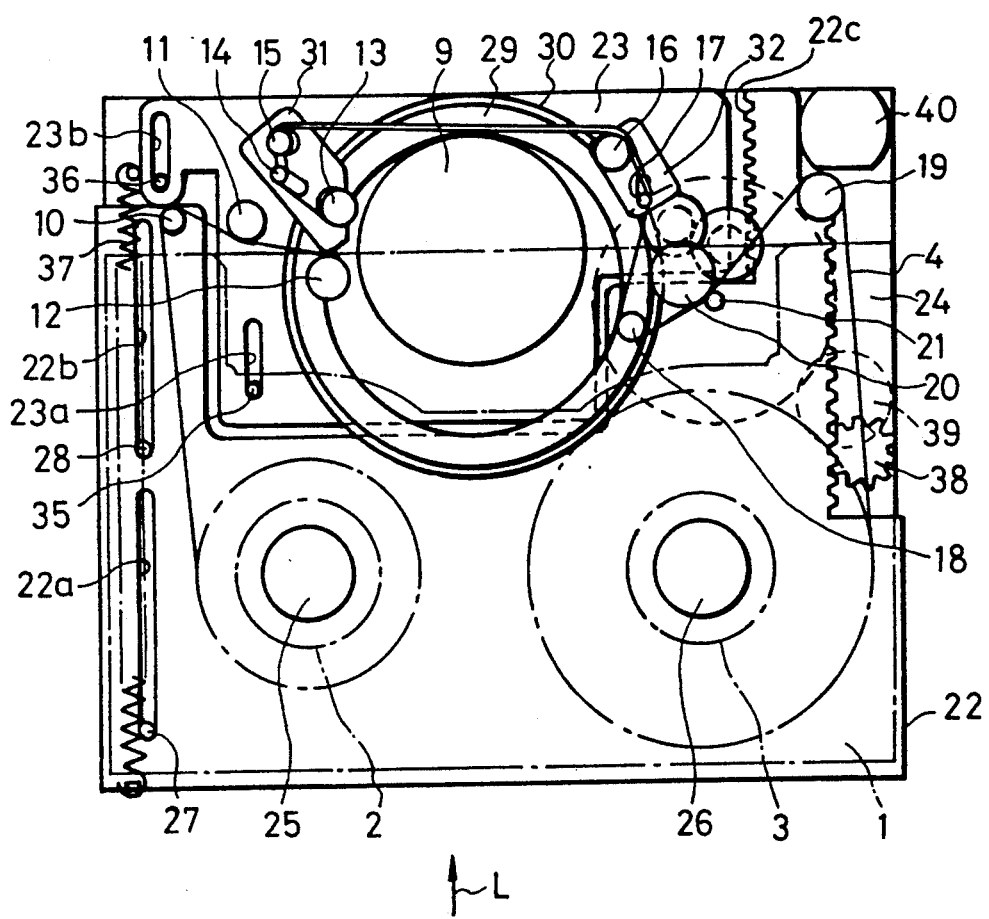
Figure 4:
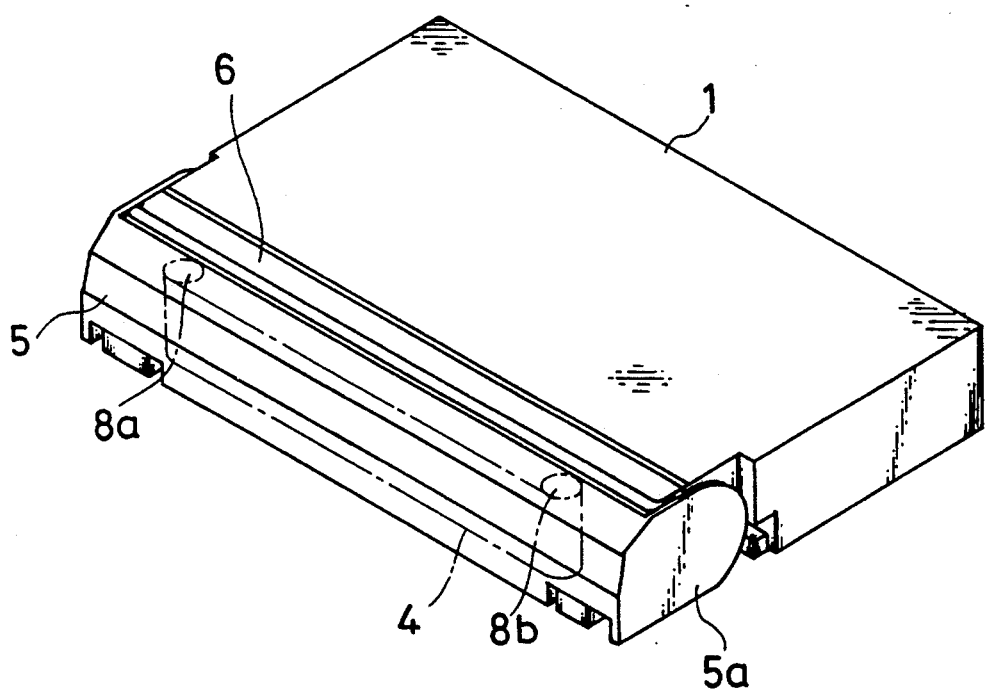
FIG. 4 is a plan side perspective view showing a known tape cassette to be loaded in the recording/reproducing apparatus.
Figure 5:
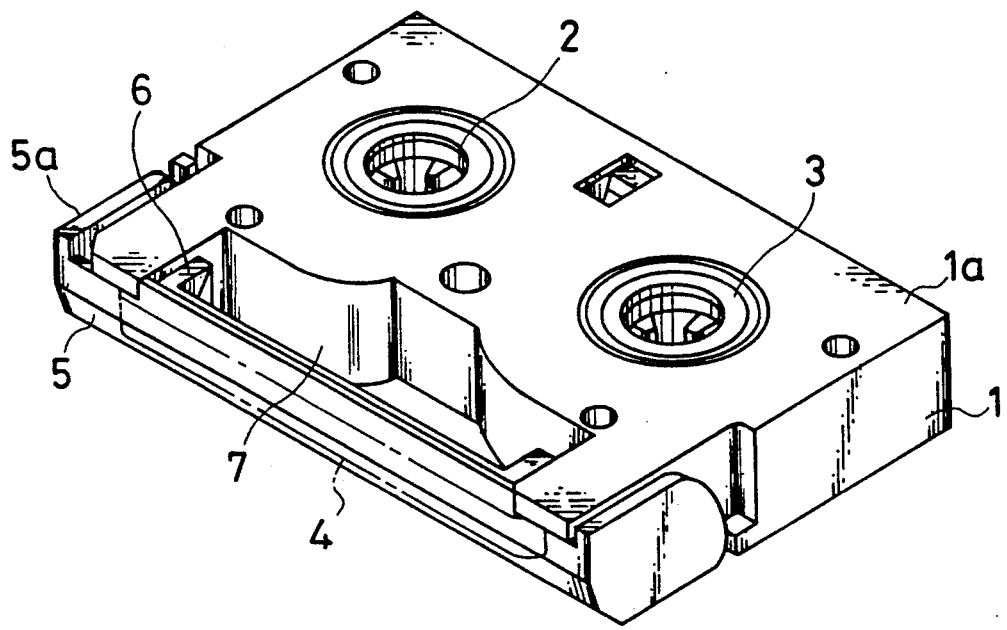
FIG. 5 is a rear side perspective view showing the tape cassette of FIG. 4.
Figure 6:
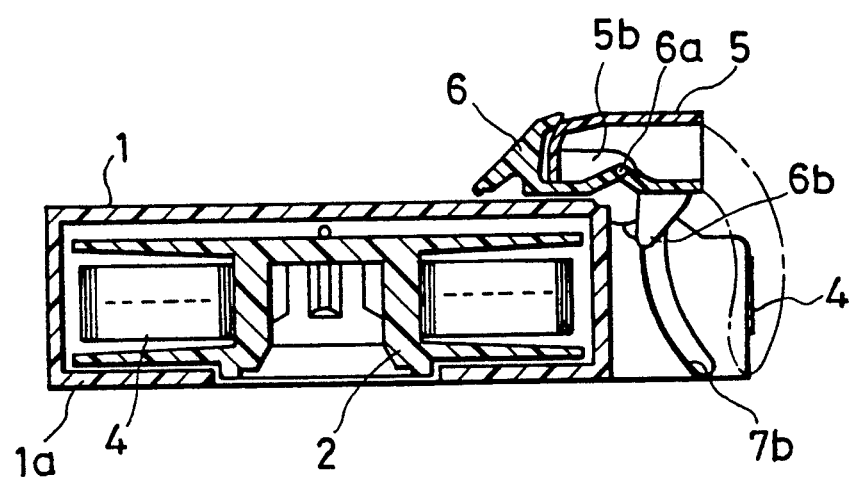
FIG. 6 is a cross-sectional side view showing the tape cassette of FIG. 4.
Figure 7:
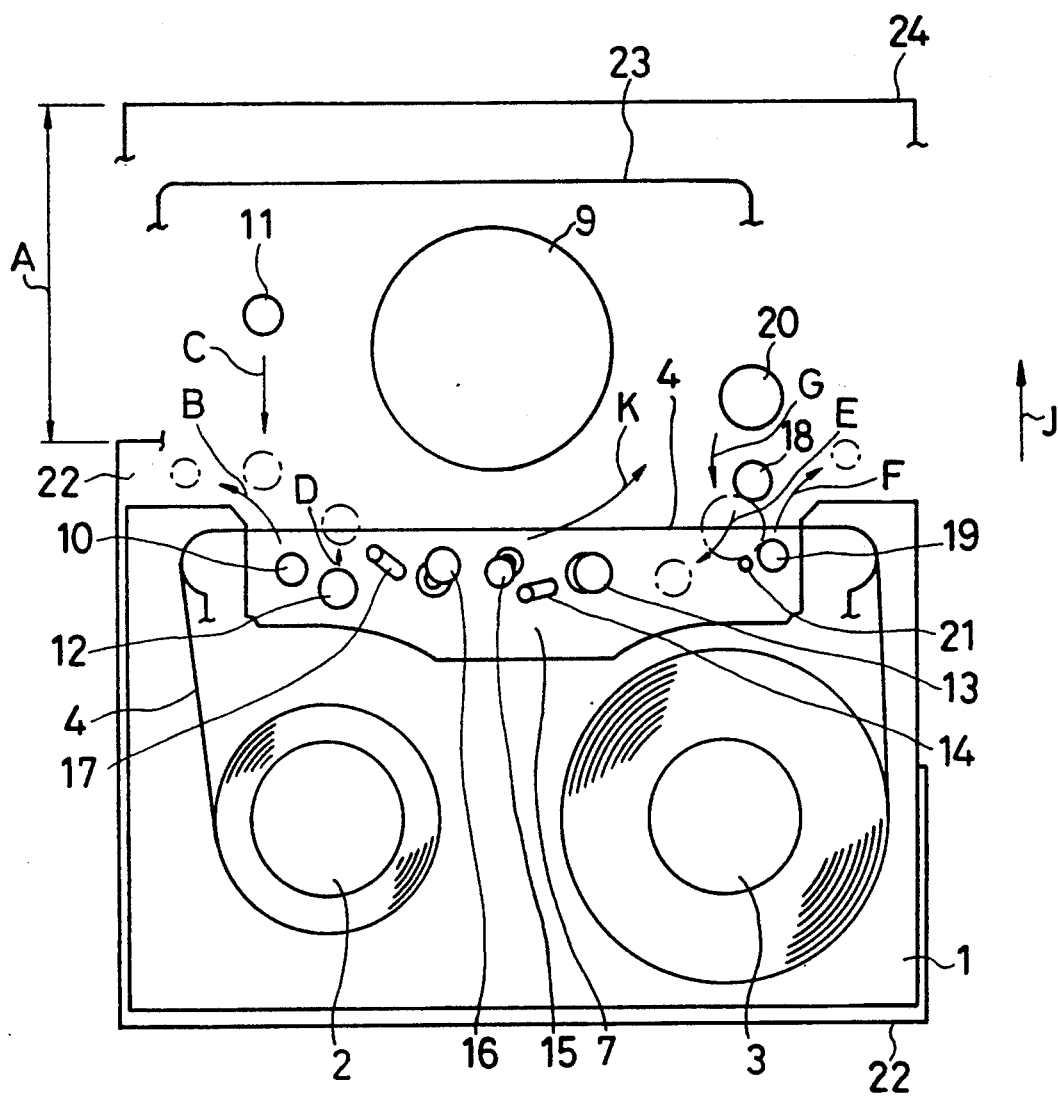
FIG. 7 is a plan view showing main parts of a tape loading mechanism of the recording/reproducing apparatus of the first embodiment in accordance with the present invention.
Figure 8:
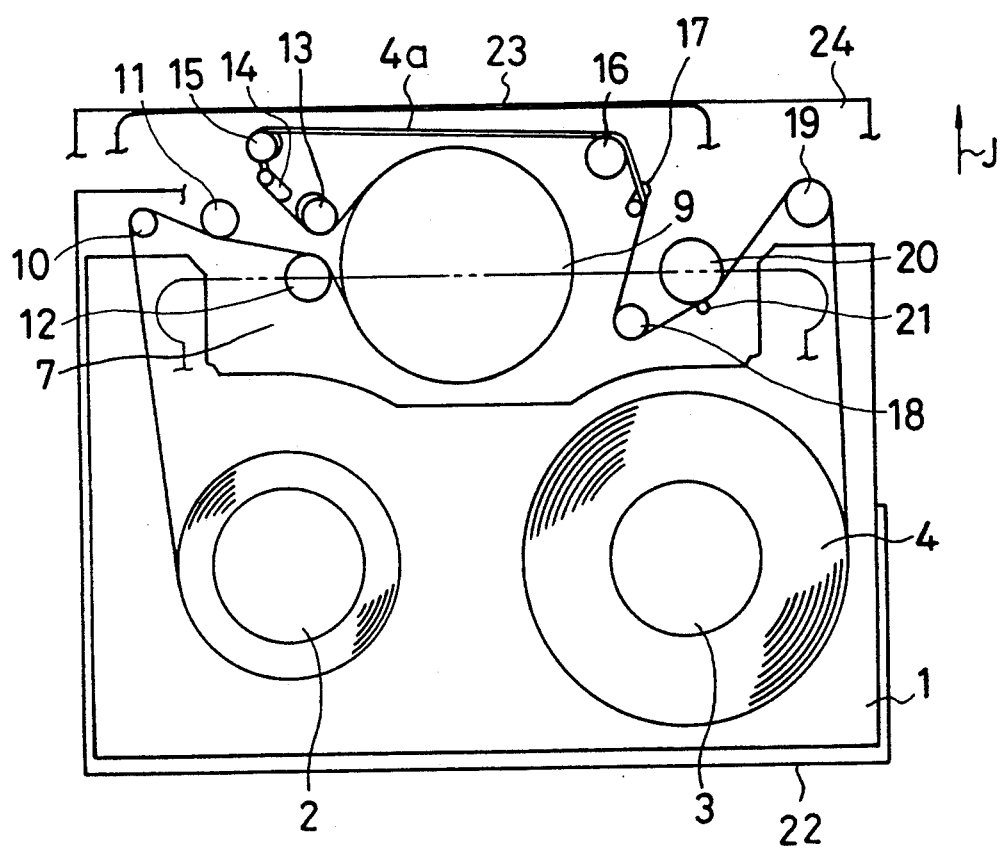
FIG. 8 is a plan view showing the main parts of the tape loading mechanism on a finished winding operation.

FIGS. 1 to 3 are plan views showing main parts of a loading mechanism of the recording/reproducing apparatus in accordance with the present invention. FIG. 4 is a plan side perspective view showing a tape cassette which is to be loaded in the recording/reproducing apparatus of the present invention. FIG. 5 is a rear side perspective view showing the tape cassette of FIG. 4. FIG. 6 is a cross-sectional side view showing the tape cassette of FIG. 4. FIGS. 7 and 8 are plan views showing the main tape loading mechanism in the cassette loading operation of the recording/reproducing apparatus. FIG. 9 shows the movements of the tape loading mechanism in the cassette loading operation of the first embodiment in accordance with the present invention.

Referring to FIGS. 4 to 6, a tape cassette 1 which is to be loaded in the recording/reproducing apparatus is described.

Tape 4, which is wound around a supply well as a take-up reel 3 in the tape cassette 1, is stretched therebetween through a pair of cassette posts 8a, 8b in the front of the tape cassette 1. The stretched tape 4 and the cassette posts 8a, 8b are shown by the alternate long and short dash lines in FIG. 4 and FIG. 5. The part of the tape 4 disposed in the front part of the tape cassette 1 is disposed between a lid 5 and a back lid 6, which is situated near the back face of the stretched tape 4 between the cassette posts 8a and 8b, when the tape cassette 1 is not loaded in the recording/reproducing apparatus.

As shown in FIG. 5, an opening 7 of the tape cassette 1 is formed on a front side of the rear face 1a. The opening 7 of the tape cassette 1 is arranged in a manner to provide therein various loading posts for drawing the stretched tape 4 from the tape cassette 1 to an inner part of the recording/reproducing apparatus when the tape cassette 1 is loaded in the recording/reproducing apparatus. When the tape cassette 1 is loaded into the recording/reproducing apparatus of the first embodiment, a known lid opening mechanism (not shown) for opening the lid 5 and the back lid 6 of the tape cassette 1 operates by contacting a side face 5a of the lid 5 so as to open the lid 5 and the back lid 6 as shown in FIG. 6.

In a non-loaded state where the tape cassette 1 is out of the recording/reproducing apparatus, the back lid 6 is arranged at a rear side of the lid 5 with the stretched tape 4 in between. Referring to FIG. 6, the back lid 6 is supported by a support plate 5b of the lid 5, by an end portion 6a of the back lid 6 on the support plate 5b. A guide pin 6b of the back lid 6 is engaged with an arc-shaped guide groove 7b which are formed on both side faces 7a of the tape cassette 1, and is guided rotatably by the arc-shaped guide grooves 7b. Therefore, when the tape cassette 1 is loaded in the recording/reproducing apparatus, the lid 5 and the back lid 6 are rotated by the lid opening mechanism along a predetermined locus as shown by the alternate long and short dash line in FIG. 6 without contact to the tape 4 stretched in front of the tape cassette 1.

When the lid 5 and the back lid 6 are entirely opened by the lid open mechanism, the lid and the back lid 6 are rotated to expose the tape 4 stretched between the cassette posts 8a and 8b. The lid 5 and the back lid 6 are moved distances larger than the width of the tape 4. Referring to FIG. 7, a known tape guide drum 9 in the recording/reproducing apparatus can be inserted into the opening 7 of the tape cassette 1 when the tape cassette is loaded in the recording/reproducing apparatus.

The movement of the main tape loading mechanism in the above-mentioned recording/reproducing apparatus is now described with reference to FIG. 7 and FIG. 8. FIG. 7 is the diagrammatic plan view showing an arrangement of the main parts of the tape loading mechanism in a first step of a cassette loading operation. FIG. 8 is the diagrammatic plan view showing a tape path established by the main parts of the tape loading mechanism in the end step of the cassette loading operation.

In FIG. 7, the tape 4 of the tape cassette 1, which has been described in the foregoing explanation with reference to FIGS. 4 to 6, is stretched in front of the tape cassette 1 in the recording/reproducing apparatus when the tape cassette 1 is first put on a first frame 22 in a first step of the cassette loading operation. The tape guide drum 9 having known rotary heads (not shown) is located inside the recording/reproducing apparatus when the tape cassette 1 is first put on the first frame 22 at a position shown in FIG. 7.

As shown in FIG. 7, various loading posts 10, 12, 13, 14, 15, 16, 17, 19 for forming a tape path and a capstan 21 are moved into the opening 7 of the tape cassette 1 when the tape cassette 1 is first put in the recording/reproducing apparatus. The other loading posts 11, 18, a pinch roller 20 and the tape guide drum 9 are arranged outside the opening 7, facing against the stretched tape 4.

The recording/reproducing apparatus of the first embodiment comprises the first frame 22 for supporting the tape cassette 1 and the like, a second frame 23 providing the tape guide drum 9, and the third frame 24 supporting the first frame 22 and the second frame 23. When the tape cassette 1 is just put on the first frame 22 in the first step of the cassette loading operation, an innermost end of the first frame 22 and an innermost end of the third frame 24 are positioned to have a predetermined interval A as shown in FIG. 7. The necessary mechanism for loading the tape cassette 1 is arranged in a space which is between the innermost faces of the first frame 22 and the third frame 24.

The cassette loading operation of the above-mentioned tape loading mechanism of the recording/reproducing apparatus is now described with reference to FIGS. 7 and 8.

As shown in FIG. 7, in the first step of the cassette loading operation, the loading posts 10, 11, 12, 18, 19 and the pinch roller 20 start to move toward the predetermined positions shown by the alternate long and short dash lines in FIG. 7. In other words, the loading posts 10, 11, 12, 18, 19 and the pinch roller 20 are slid in directions shown by arrows B, C, D, E, F, G, respectively. At the same time, the first frame 22 starts to move in a direction shown by an arrow J. As a result, the tape cassette 1 approaches the tape guide drum 9. During the approachment of the tape cassette 1 towards the tape guide drum 9, the tape 4 in the tape cassette 1 is wound around the tape guide drum 9 by motions of the loading posts 13, 14, 15, 16, 17 in the direction shown by an arrow K. Then a predetermined tape path, where the tape 4 is passed around the loading posts and the tape guide drum 9, is established in the recording-/reproducing apparatus. FIG. 8 shows the established tape path 4a for the recording or reproducing apparatus of the first embodiment.

Figure 9A:
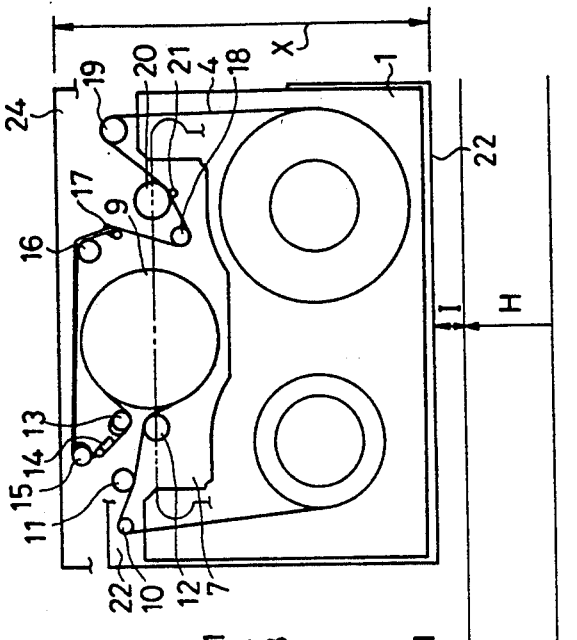
FIG. 9($a$), 9($b$), and 9($c$) show movements of the tape loading mechanism in a loading operation of the first embodiment.
Figure 9B:
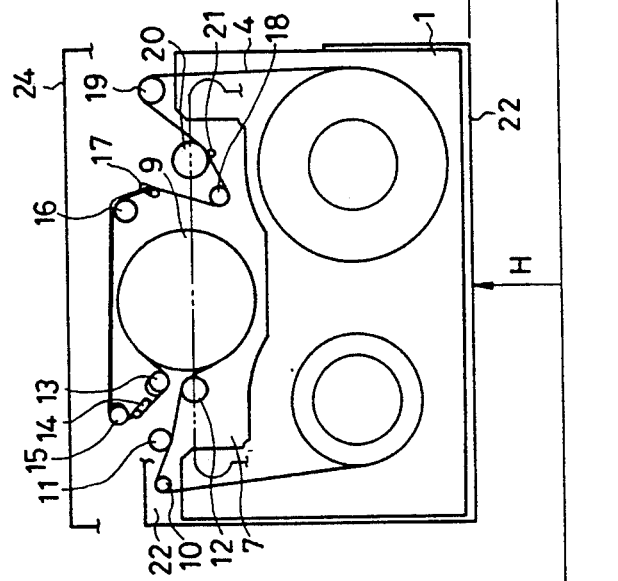
Figure 9C:
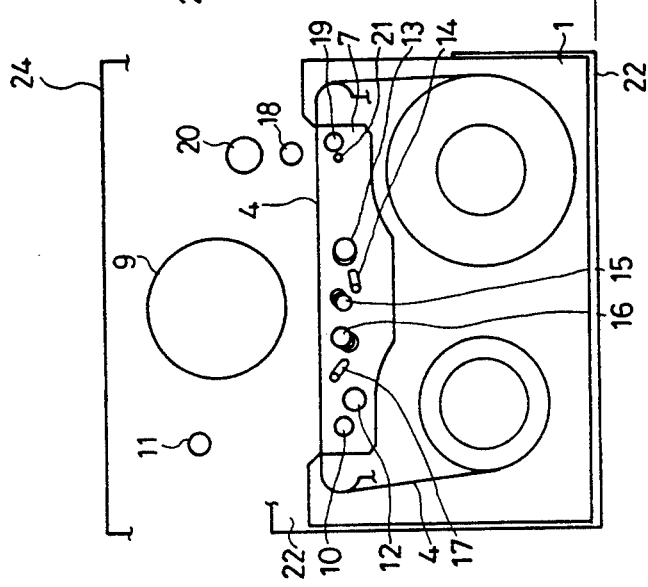

FIGS. 9(a), 9(b) and 9(c) show three stages in the above-mentioned cassette loading operation of the first embodiment in accordance with the present invention. FIG. 9(a) shows the first stage of the cassette loading operation, FIG. 9(b) shows the intermediate stage of the cassette loading operation when a tape loading operation is finished, and FIG. 9(c) shows the end stage of the cassette loading operation. When the tape 4 of the tape cassette 1, which is put on the first frame 22, is wound around the tape guide drum 9 as shown in FIG. 9(b), the first frame 22 has moved an interval H from the first stage shown in FIG. 9(a) of the cassette loading operation. The first frame 22 holding the tape cassette 1 and the second frame 23 providing the tape guide drum 9 have already been slid for an interval I from the intermediate stage shown in FIG. 9(b), when the tape cassette 1 becomes loaded completely into the recording-/reproducing apparatus (FIG. 9(c)). Accordingly, when the first frame 22 which holds the tape cassette 1 is slid for the interval H+I, the cassette loading operation of the recording/reproducing apparatus has been finished. Since the advancing motion of the interval I is provided, total depth X of the apparatus box can be decreased in comparison with the conventional apparatus. As a result, the compact recording/reproducing apparatus can be obtained.

A loading operation will now be described with a concrete example shown in FIG. 1 to FIG. 3 with regard to the above-mentioned recording/reproducing apparatus of the first embodiment. Since a driving mechanism for sliding the above-mentioned loading posts 10, 12, 18, 19 and the pinch roller 20 is operated by the known prior art, descriptions of the parts of loading ring means, the driving mechanism for sliding the loading posts 10, 12, 18, 19 and so on are omitted from the following description.

FIG. 1 is a plan view showing main parts of a cassette loading mechanism in the recording/reproducing apparatus. In FIG. 1, a capstan 21 for driving the tape 4 from the supply reel 2 to the take-up reel 3 is put on the first frame 22. On the first frame 22, a supply reel stand 25 and a take-up reel stand 26 are provided. A capstan motor 21a, which is configured integral with the capstan 21, is provided under the first frame 22. The capstan 21 is rotated by the capstan motor 21a in both directions, that is in a clockwise and a counterclockwise in FIG. 1. A transmission mechanism for transmitting the turning force to the supply reel stand 25 and the take-up reel stand 26 from the captain motor 21a is provided under the first frame 22. The supply reel stand 25 and the take-up reel stand 26 can be rotated in a desired direction by changing the rotary direction of the capstan 21. The rotary direction of the soapily reel stand 25 or the take-up reel stand 26 is decided by the use of known art, e.g. a driving gear system (not shown) whereof the position is changed by friction thereof after transmission of the turning force of the capstan motor 21a to the operation gear through a belt (not shown). Since the transmission mechanism have been known and widely used, an explanation for the transmission mechanism is omitted from the following description.

In the first embodiment, the first frame 22 comprises a known cassette guide mechanism (not shown) for guiding the tape cassette 1 to be loaded into the recording/reproducing apparatus. Since the cassette guide mechanism is known and used, an explanation for the cassette guide mechanism is omitted here.

The first frame 22 having the cassette guide mechanism for guiding the tape cassette 1 to the first frame 22 is supported slidably on the third frame 24. Two guide grooves 22a, 22b of the first frame 22 are engaged with two guide pins 27, 28 on the third frame 24, respectively. Therefore, a sliding direction and a sliding interval of the first frame 22 are defined by the engagement between the guide grooves 22a, 22b, and guide pins 27, 28.

On the second frame 23, the above-mentioned tape guide drum 9, an upper loading ring 29, a lower loading ring 30, and a stationary loading post 11 for forming the tape path, are provided as shown in FIG. 1. The above-mentioned loading posts 13, 14, 15, 16, 17 for forming the tape path are provided on the loading rings 29, 30. The loading posts 13, 14, 15 are provided on a first carrier 31 which is mechanically connected to the upper loading ring 29 so as to rotate in a predetermined way. The loading posts 16 and 17 are provided on a second carrier 32 which is mechanically connected to the lower loading ring 30 so as to rotate in a predetermined way. Since the loading rings 29, 30 are meshed with a second gear 22c of the first frame 22 through two double gears 33, 34 which are pivotably held on the second frame 23, the loading rings 29, 30 are rotated by moving relatively between the first frame 22 and the second frame 23.

The second frame 23 is slidably supported on the third frame 24 similarly to the first frame 22. Two guide grooves 23a, 23b of the second frame 23 are engaged with two guide pins 35, 36 on the third frame 24, respectively. Therefore, a sliding direction and a sliding interval of the second frame 23 are decided by the engagement between the guide grooves 23a, 23b and the guide pins 35, 36. The sliding direction of the second frame 23 is selected in the same direction as the first frame 22. The sliding interval of the second frame 23 is selected to be shorter than the sliding interval of the first frame 22. A spring 37 is engaged between the first frame 22 and the second frame 23 so as to pull them to each other.

A first gear 22d of the first frame connected with a loading motor 40 through a driving gear 38, a reducing unit 39 and a driving belt (not shown) which are mounted on the third frame 24. Therefore, the first frame 22 is slid by the driving force from the operated loading motor 40. The movement of the first frame 22 is not transmitted to the loading motor 40 because the reducing unit 39 having high reduction ratio is provided therebetween.

The cassette loading operation of the above-mentioned recording/reproducing apparatus is now described with reference to FIGS. 1 to 3.

FIG. 1 shows a tape cassette 1 which is first put on the first frame 22 by the cassette guide mechanism (not shown). When the tape cassette 1 is first put on the first frame 22 as shown in FIG. 1, the loading posts 13, 14, 15, 16, 17 are arranged within the opening 7 of the tape cassette 1 as stated before (FIG. 7). In the above-mentioned state shown in FIG. 1, when the loading motor 40 is operated, the turning force of the loading motor 40 is transmitted to the driving gear 38 through the drive belt (not shown) and through the reducing unit 39 for reducing the revolution speed. Then the first frame 22 starts to slide toward the second frame 23, toward the inner part of the apparatus as shown by an arrow J in FIG. 1. At that time, the second frame 23 stays at an initial position on the third frame 24 being pulled by resilience of the spring 37 with its motion stopped by a known stopper (not shown).

As a result, the first frame 22 is moved relatively against the second frame 23, and the two loading rings 29, 30 are started to rotate in a direction shown by an arc shape arrow K in FIG. 1. The revolution speed of the upper loading ring 29 is different from the revolution speed of the lower loading ring 30 because the upper loading ring 29 meshes with an upper gear of the double gear 33 and a lower loading ring 30 meshes with the lower gear of the double gear 33. The upper gear and the lower gear of the double gear 33 each have a different number of teeth. Therefore, the first carrier 31 on the upper loading ring 29 and the second carrier 32 on the lower loading ring 30 are moved gradually from each other because of different the revolution speed of the loading rings 29, 30.

FIG. 2 shows an intermediate state in the tape loading operation for forming the tape path. In FIG. 2, the loading posts 10, 12, 18, 19 and the pinch roller 20, which are omitted from FIG. 1, are shown for reference. As shown in FIG. 2, since the first carrier 31 and the second carrier 32 are rotated at different rotation speeds, the loading posts 13, 14, 15 on the first carrier 31 and the loading posts 16, 17 on the second carrier 32 reach predetermined different positions at the intermediate state of the cassette loading operation at the end stage of the tape loading operation. These loading posts 13, 14, 15, 16, 17 are precisely arranged at a predetermined position because the first carrier 31 having the loading posts 13, 14, 15 and the second carrier 32 having the loading posts 16, 17 are pressed against stoppers (not shown) at the predetermined position by springs (not shown). In the above-mentioned intermediate state of the cassette loading operation, the tape path for the tape 4 shown by a solid line in FIG. 2 is formed by the tape guide drum 9, the loading posts 13, 14, 15, 16, 17 the pinch roller 20, capstan 21 and the like.

When the tape path is formed at the intermediate step in the cassette loading operation as shown in FIG. 2, a contact portion 22e of the first frame 22 abuts to a projection 23c of the second frame 23, and the function of the spring 37 for pulling the first frame 22 is over. As a result, the relative movement between the first frame 22 and the second frame 23 has been finished, and the two rotary movements of the upper loading ring 29 and the lower loading ring 30 have been also finished.

In the above-mentioned intermediate state of the cassette loading operation, the tape path has been just established as shown in FIG. 2 when the loading posts 13, 14, 15, 16, 17 reach the predetermined positions by the operated loading motor 40. Since the loading motor 40 is still operating in a same rotary direction after the first frame 22 abuts to the second frame 23, the first frame 22 and the second frame 23 are moved together in the same direction shown by the arrow J in FIG. 2.

When the first frame 22 and the second frame 23 reach a predetermined position as shown in FIG. 3, the loading motor 40 is stopped by an actuated switch means (not shown).

In the final state of the cassette loading operation, the first frame 22 and the second frame 23 are entirely stopped from sliding on the third frame 24, and the recording/reproducing apparatus having the first frame 22, the second frame 23 and the third frame 24 is configured with a compact size as shown in FIG. 3. In other words, though the rear space of the tape guide drum 9 is arranged for the movement of the loading posts 13, 14, 15, the rear space receives the second frame 23 after the loading posts 13, 14, 15 pass through the rear space. Therefore, the recording/reproducing apparatus of the present invention can be constructed in a minimum space to receive the whole mechanism for forming the tape path.

In the above-mentioned description of the recording/reproducing apparatus, the movement of the other loading posts 10, 12, 18, 19 and the pinch roller 20 are not described. It would be obvious, however, that these loading posts 10, 12, 18, 19 and the pinch roller 20 may be moved in the predetermined way by known rotary plates having these loading posts 10, 12, 18, 19 and the pinch roller 20 linked with the relative movement between the first frame 22 and the second frame 23.

According to the above-mentioned recording/reproducing apparatus of the first embodiment, since the recording/reproducing apparatus has the advantage of a reduction in size and weight, the recording/reproducing apparatus can be easily incorporated in a VCR, especially a portable VCR having a camera unit. By inserting the tape cassette 1 in only one direction (arrow L in FIG. 3) on the cassette guide mechanism of the third frame 24, the tape cassette 1 can be easily loaded in the recording/reproducing apparatus. Therefore, the necessary space for inserting the tape cassette 1 is reduced in size, and the recording/reproducing apparatus is good for incorporating in a portable VCR.

Further, the recording/reproducing apparatus has the advantage of being a simple cassette loading mechanism. The simple cassette loading mechanism has only one loading motor 40 which provides the whole necessary driving force, and one spring 37 which controls the first frame 22 and the second frame 23.

Figure 10:
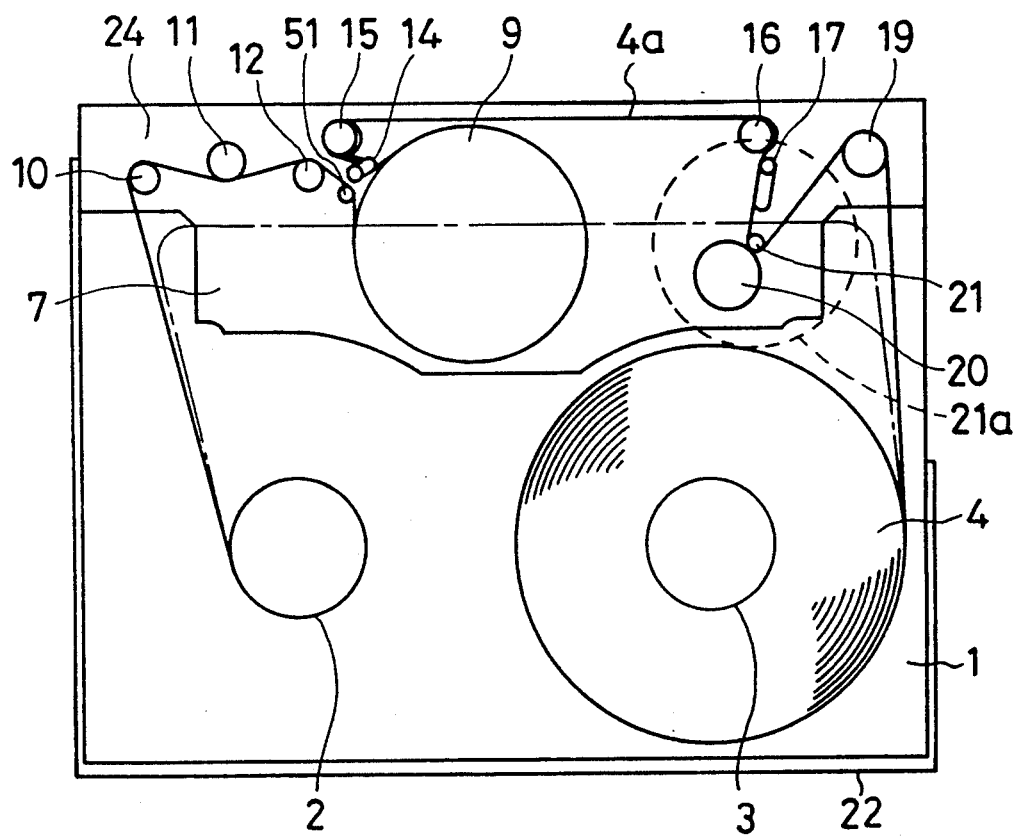
FIG. 10 is a plan view showing main parts of a recording/reproducing apparatus of a second embodiment in accordance with the present invention.

Hereafter, a second embodiment of a recording/reproducing apparatus of the present invention is described referring to the accompanying drawings of FIG. 10. FIG. 10 is a plan view showing main parts of a tape loading mechanism of the recording/reproducing apparatus, and shows a tape path 4a in the second embodiment. In FIG. 10, a tape 4 is stretched in front of the tape cassette 1 in a first step of a tape loading operation as shown by the alternate long and short dash line in FIG. 10. Corresponding parts and components to those of the first embodiment are shown by the same numerals and marks, and the descriptions of the first embodiment similarly apply. Differences and features of this second embodiment from the first embodiment are as follows.

In the second embodiment, two loading posts 13 and 18, which are provided in the aforementioned first embodiment, are not provided in this recording/reproducing apparatus, but a loading post 51 is provided in the second embodiment. In the second embodiment, an inclined loading post 17 is arranged outside the opening 7 of the tape cassette 1. The pinch roller 20 and the capstan 21 are arranged opposite in relation to tape 4 to that of the aforementioned first embodiment.

In order to form the tape path 4a in the second embodiment, loading posts 10, 12, 51, 14, 15, 16, 19 and the pinch roller 20 are inserted into the opening 7 of the tape cassette 1 when the tape cassette 1 is first put on the first frame 22. At that time, the other posts 11, 17, a tape guide drum 9 and the capstan 21 are arranged on an outside of the opening 7 to face the stretched tape 4.

The tape loading operation of the above-mentioned second embodiment of the recording/reproducing apparatus is now described with reference to FIG. 10.

After the tape cassette 1 is put on the first frame 22 of the recording/reproducing apparatus, the loading posts 10, 12, 51, 14, 15, 16, 19 and the pinch roller 20 start to move toward the predetermined positions shown in FIG. 10 for forming the tape path 4a. At that time, the first frame 22 supporting the tape cassette 1 is slid to the inner part of the recording/reproducing apparatus similarly to the aforementioned first embodiment. As a result, the tape path 4a shown in FIG. 10 is formed to be wound around the tape guide drum 9 by the loading posts 10, 12, 51, 14, 15, 16, 19, linked with the sliding operation of the first frame 22.

Since the above-mentioned recording/reproducing apparatus of the second embodiment is configured with a first frame 22, a second frame 23 and a third frame 24 in the same way as the aforementioned first embodiment, the loading mechanism of the recording/reproducing apparatus is received in a minimum space regardless of the required space for the movement of the loading posts 14, 15, 16, 17.

In the second embodiment, the capstan 21, the capstan motor 21a and the inclined loading post 17 are mounted on the second frame 23 or the third frame 24, apart from the first embodiment where the capstan 21, the capstan motor 21a and the inclined loading post 17 are mounted on the first frame 22. As a result, the recording/reproducing apparatus is constructed with a simpler tape loading mechanism in comparison with that of the first embodiment, since the capstan 21, the capstan motor 21a and the inclined loading post 17 can be selected to slide on a short interval or not to slide on the third frame 24 for forming the tape path.

Further, in the second embodiment, the number of loading posts which are moving around the tape guide drum 9 are less by two than that of the first embodiment. Therefore, the recording/reproducing apparatus has a further simplified tape loading mechanism in comparison with the first embodiment.

Apart from the above-mentioned first and second embodiments wherein the loading posts 13, 14, 15, 16, 17 for forming the tape path are moved by the upper loading ring 29 and the lower loading ring 30, a modified embodiment may be one in which the loading posts are moved by using a cam and a lever.

Further from the above-mentioned first and second embodiments wherein the first frame 22 and the second frame 23 are slid on the third frame 24 by the loading motor 40, a modified embodiment one in which the first frame and the second frame are slid by the other driving mechanism or a manual control of a user in order to reduce size and save electric power.

Figure 13:
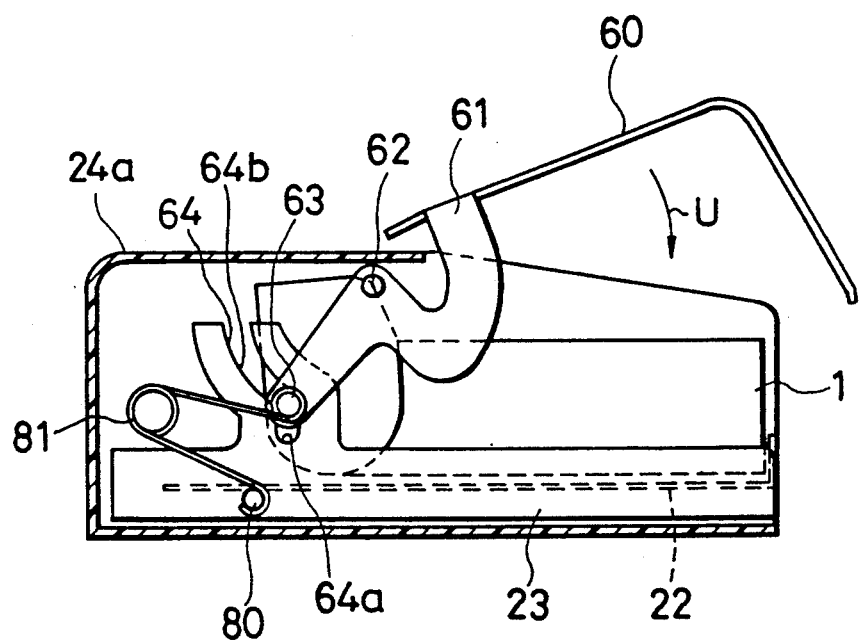
Figure 14:
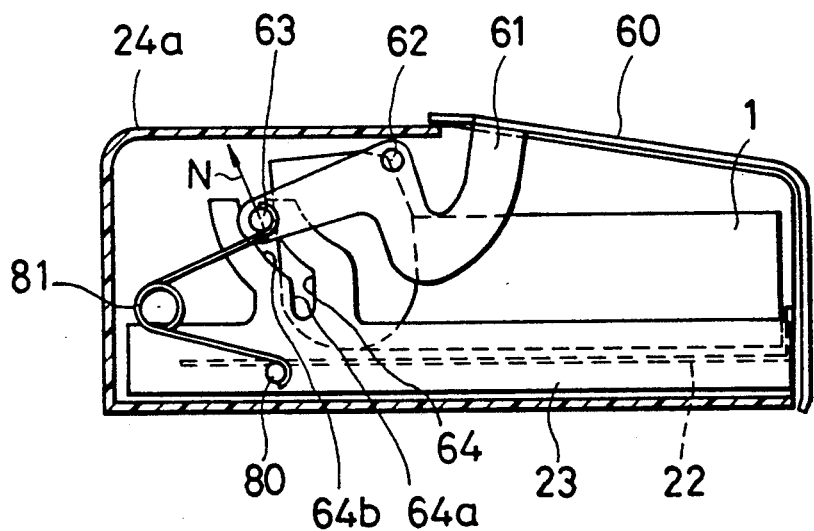
Figure 15:
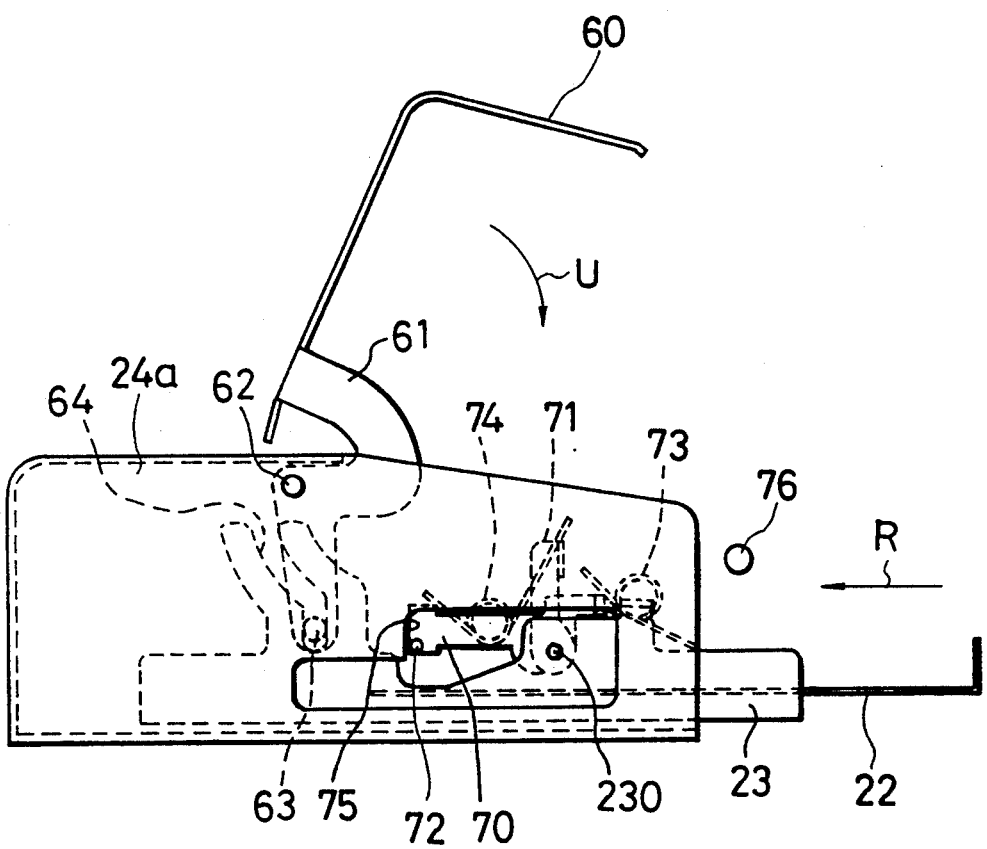
FIG. 15 and FIG. 16 are side views of the recording/reproducing apparatus of FIG. 11 for showing a turning block mechanism.
Figure 16:
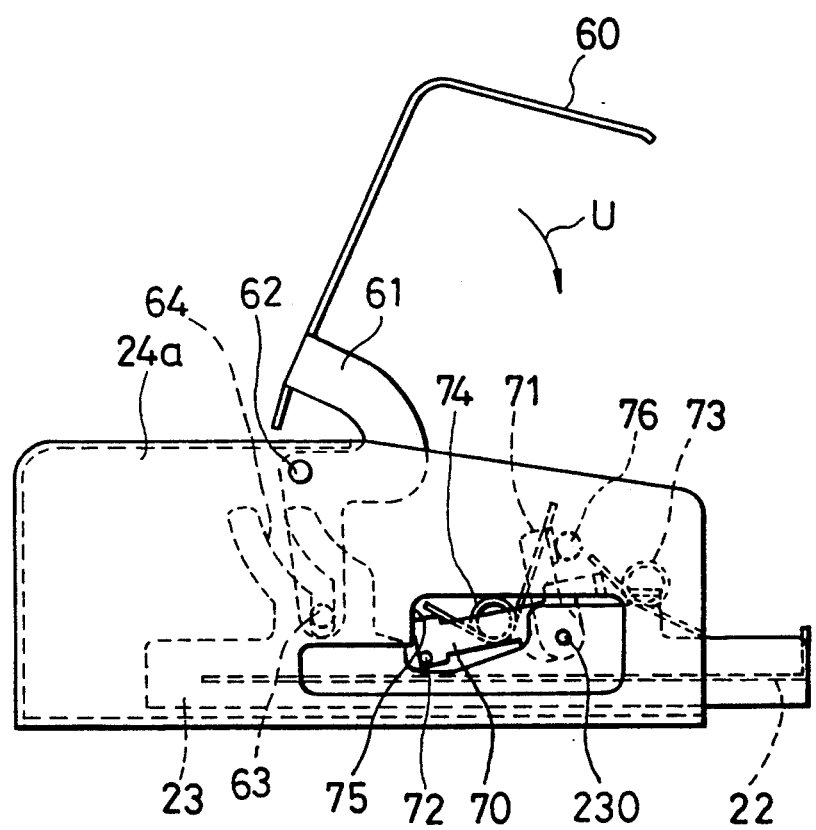
Figure 17:
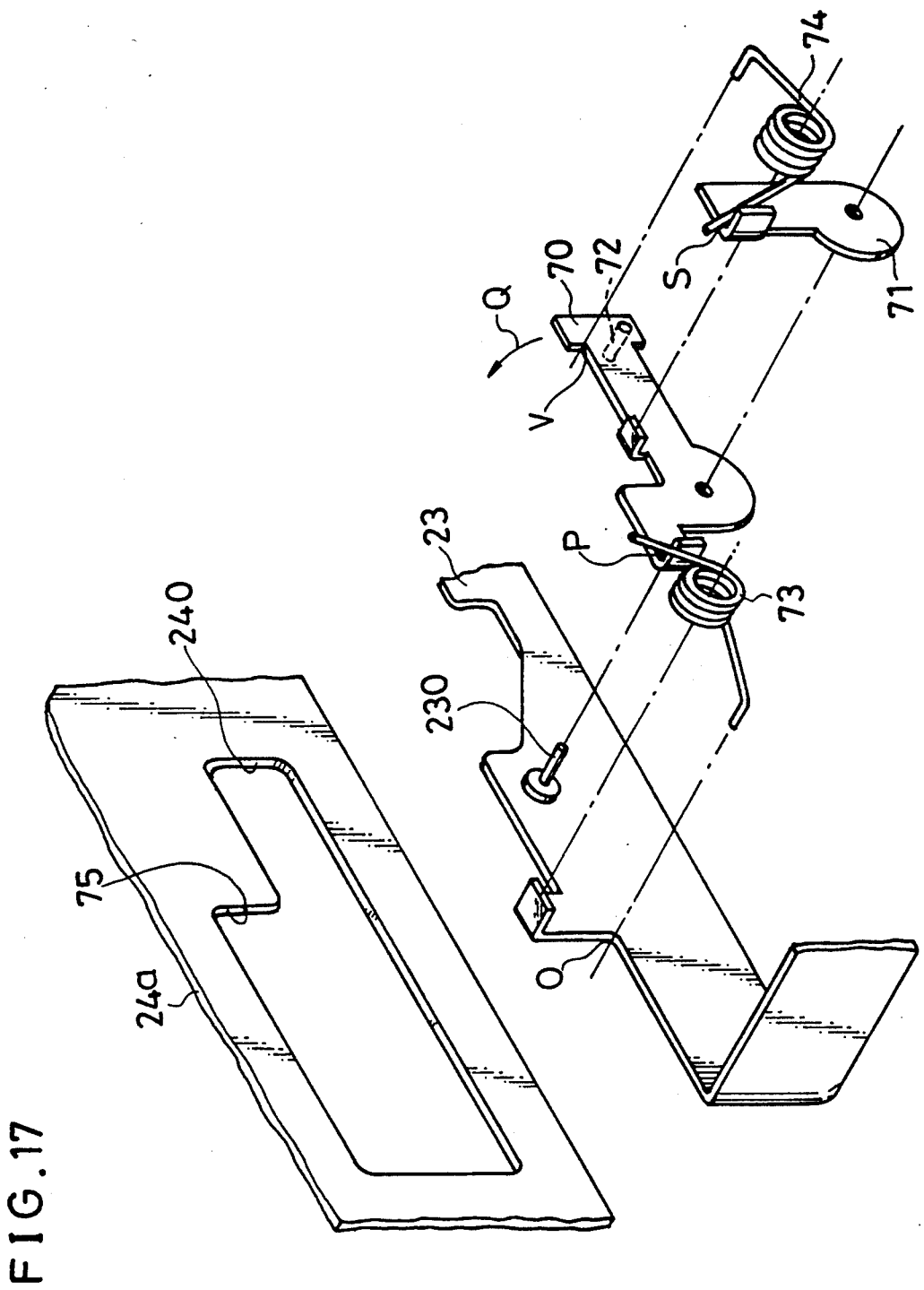
FIG. 17 is an exploded perspective view of the turning block mechanism of FIG. 15.

Hereafter, a third embodiment of a recording/reproducing apparatus of the present invention is described referring to the figures of the first and second embodiments, as well as the accompanying drawings of FIGS. 11 to 17. FIG. 11 to FIG. 14 are cross-sectional side views showing the recording/reproducing apparatus which shows the operation of a cassette loading operation. FIG. 15 and FIG. 16 are side views showing main parts of a turning block mechanism of the recording/reproducing apparatus. FIG. 17 is an exploded perspective view showing the main parts of the turning block mechanism. Corresponding parts and components to the first embodiment are shown by the same numerals and marks, and the description of the first embodiment similarly applies. The features of this third embodiment and the differences from the first embodiment are as follows.

In the third embodiment, a third frame 24a, which supports the first frame 22 and the second frame 23, is formed in a box shape as an outer cover of the recording/reproducing apparatus. A picture signal processing circuit, an audio signal processing circuit and a system control circuit are provided in the third frame 24a.

In the third embodiment, the driving gear 38, the reducing unit 39 and the loading motor 40 are provided on the second frame 23, whereas in the first embodiment these are provided on the third frame 24. Therefore, the first gear 22d of the first frame 22 is connected to the loading motor 40 on the second frame 23 through the driving gear 38 and the reducing unit 39 on the second frame 23. The first frame 22 is moved relatively against the second frame 23 by the operation of the loading motor 40.

As a result, the spring 37, which is provided between the first frame 22 and the second frame 23 for pulling these to each other in the first embodiment and the second embodiment, does not need to provided in the third embodiment. The first frame 22 is slidably supported on the second frame 23. Two guide pins 27, 28 which are provided on the second frame 23 are engaged in two guide grooves 22a, 22b of the first frame 22, respectively. Therefore, the sliding direction of the first frame 22 is controlled by the engagement between the guide pins 27, 28 and the guide grooves 22a, 22b.

The second frame 23 is slidably supported on the third frame 24a which is a main body of the recording-/reproducing apparatus. Since two guide pins 35, 36 which are provided on the third frame 24a are engaged in the two guide grooves 23a, 23b of the second frame 23, the sliding direction of the second frame 23 is controlled by the engagement between the guide pins 35, 36 and the guide grooves 23a, 23b.

Figure 11:
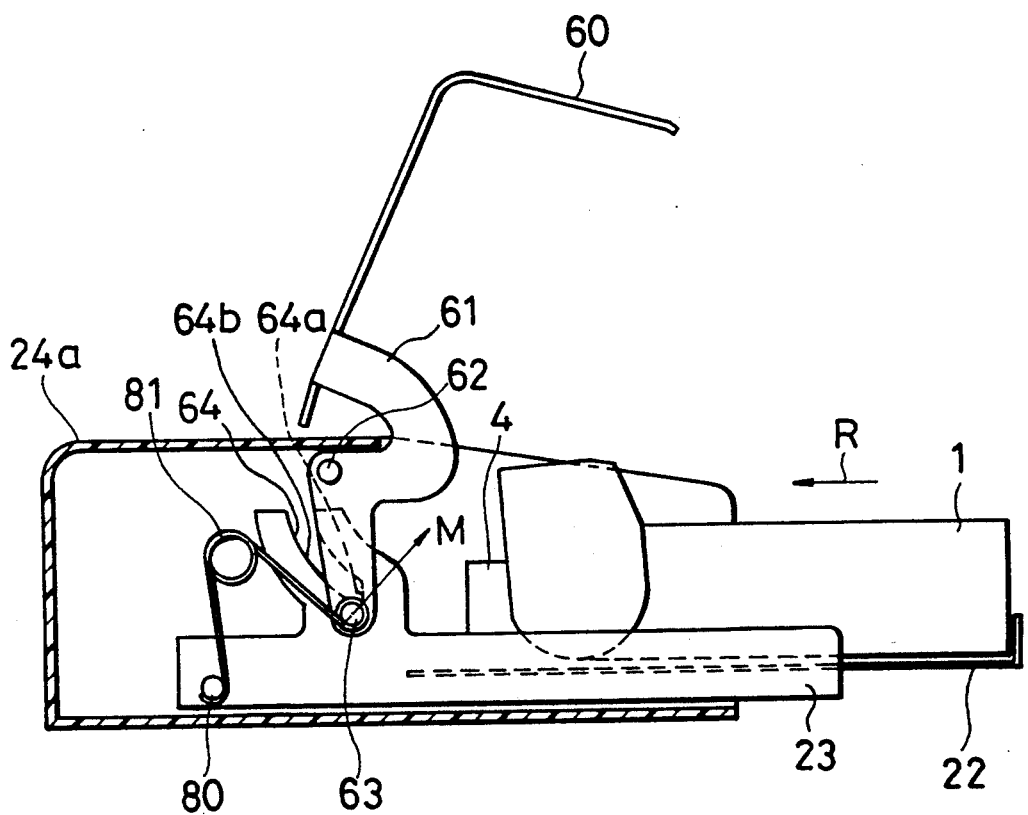
FIG. 11 to FIG. 14 are cross-sectional side views showing a recording/reproducing apparatus of a third embodiment in accordance with the present invention.
Figure 12:
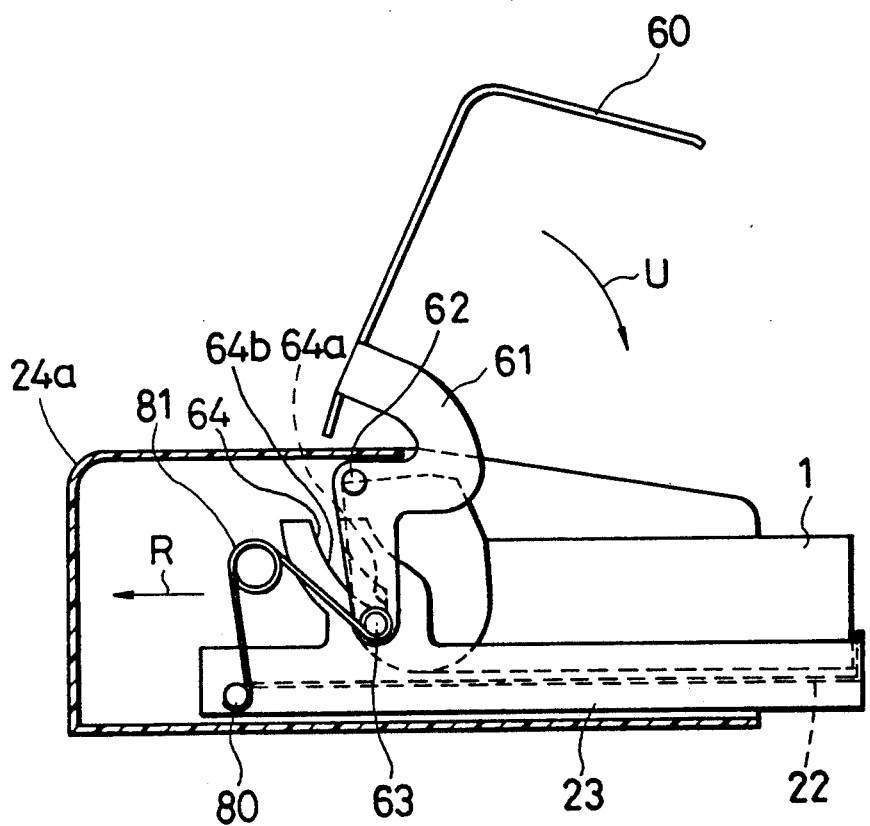

Next, the cassette loading operation of the third embodiment of the present invention is described with reference to FIGS. 11 to 14. FIG. 11 shows a side view of the recording/reproducing apparatus when the tape cassette 1 is first put on the first frame 22. FIG. 12 shows a side view of the recording/reproducing apparatus when the first frame 22 is finished moving relative to the second frame 23. FIG. 13 shows a side view of the recording/reproducing apparatus when the second frame 23 is finished moving relative to the third frame 24a, during the turning of a turn-over cover 60. FIG. 14 shows a side view of the recording/reproducing apparatus when the turn-over cover 60 is closed tightly to the third frame 24a, after the cassette loading operation is finished. The recording/reproducing apparatus is formed in a symmetrical shape with respect to the central axis including the sliding direction of the first frame 22 and second frame 23.

In FIG. 11, the turn-over cover 60, which is held to turn by the third frame 24a, is provided to shut the third frame 24a in order to prevent dust from sticking to the main parts, such as the tape cassette 1 and the tape guide drum 9 and the like, in the third frame 24a during recording or reproducing.

Arms 61, which are provided at both sides of the turn-over cover 60, are pivotably held to the third frame 24a by pivot pins 62 of the arms 61. Guide pins 63, which are provided on the arms 61, are engaged with guide grooves 64 which are formed at both sides of the second frame 23. As a result, the turning operation of the turn-over cover 60 is linked with the sliding operation of the second frame 23.

The sliding interval of the second frame 23 is controlled by the relationship between a turning angle of the turn-over cover 60 and a shape of the guide groove 64. The guide groove 64 has a straight portion 64a for sliding the second frame 23 by the turning operation of the turn-over cover 60, and a curve portion 64b for turning the turn-over cover 60.

A helical torsion coil spring 81 is arranged between the guide pin 63 of the turn-over cover 60 and a pin 80 which is provided on both sides of the third frame 24a. The helical torsion coil spring 81, which is a so-called toggle spring, energizes to open the turn-over cover 60 in a direction shown by an arrow M in FIG. 11 when the turn-over cover 60 is opened entirely from the third frame 24a as shown in FIG. 11. On the other hand, when the turn-over cover 60 is shut to the third frame 24a as shown in FIG. 14, the helical torsion coil spring 81 energizes to close the turn-over cover 60 tightly in a direction shown by an arrow N in FIG. 14.

FIG. 15 shows a side view of the recording/reproducing apparatus and shows the turning block mechanism of the recording/reproducing apparatus in a state before the first frame 22 is moved relative to the second frame 23. FIG. 16 show a side view of the recording/reproducing apparatus in a state after the first frame 22 is moved relative to the second frame 23. FIG. 17 shows an exploded perspective view of main parts of the turning block mechanism.

As shown in FIG. 17, a turning block lever 70 and a contact lever 71 are pivotably held by a pin 230 on a side face of the second frame 23. A turning block pin 72, which is provided on the turning block lever 70, contacts a stopper portion 75 of a guide groove 240 of the third frame 24a in the first step of the cassette loading operation shown in FIG. 15. The turning block lever 70 is energized in a direction Q (FIG. 17) by a spring 73 which pushes the second frame 23 (at a point 0 in FIG. 17) and the turning block lever 70 (at a point P in FIG. 17). A spring 74 is arranged so as to push the turning block lever 70 (at a Point V in FIG. 17) and the contact lever 71 (at a point S in FIG. 17). As a result, the contact lever 71 is linked with the turning block lever 70. In FIG. 15, a release pin 76 for pushing the contact lever 71 is provided on the side face of the first frame 22. The release pin 76 may be provided on the side face of the cassette guide mechanism for guiding the tape cassette 1 to the first frame 22 as a modified embodiment.

In the first step of the cassette loading operation as shown in FIG. 15, the first frame 22 is not slid on the second frame 23. If the turn-over cover 60 is turned to shut in a direction shown by an arrow U in FIG. 15, the turning block pin 72 abuts against the stopper 75 of the guide groove 240 of the third frame 24a. Therefore, the second frame 23 is prevented from sliding on the third frame 24a before abutment of the first frame 22 to the second frame 23, and the turning operation of the turn-over cover 60 is prohibited under the above-mentioned state shown in FIG. 15.

As shown in FIG. 16, when the first frame 22 is finished sliding on the second frame 23, (when the relative movement between the first frame 22 and the second frame 23 finished), the release pin 76 which slides with the first frame 22 presses contact lever 71 to rotate it counterclockwise as shown in FIG. 16. The turning block level 70 s turned by the spring 74 which connects the contact lever 71 and the turning block lever 70. As a result, the turning clock pin 72 is released from the stopper 75, and the second frame 23 can be slid on the third frame 24a by the shutting operation of the turn-over cover 60.

The cassette loading operation in the third embodiment of the recording/reproducing apparatus is now described with reference to FIGS. 12 to 14.

FIG. 12 shows the recording/reproducing apparatus in the state when the first frame 22 finishes moving relative to the second frame 23. In FIG. 12, when the turn-over cover 60 is turned in the direction U, the guide pin 63 of the arm 61 presses on an edge of the straight portion 64a of the guide grooves 64. Then, the second frame 23 together with the first frame 22 are slid in a direction shown by an arrow R to be received in the inner part of the third frame 24a as shown in FIG. 13.

After the recording/reproducing apparatus comes to the position shown in FIG. 13, the turn-over cover 60 can be freely turned around the turning pin 62 without the sliding movement of the second frame 23, since the guide pin 63 for the turn-over cover 60 is guided by the curve portion 64b of the guide groove 64. In the final state of the cassette loading operation as shown in FIG. 14, the turn-over cover 60 is locked by a known locking mechanism (not shown) to be closed tightly to the third frame 24a. Therefore, the main components in the recording/reproducing apparatus are protected as shown in FIG. 14.

In FIG. 14, since the helical torsion coil spring 81 is provided to spread between the guide pin 63 fixed to the arm 61 and the pin 80 fixed to the third frame 24a, the turn-over cover 60 is energized to be tightly closed in the closing state of the recording/reproducing apparatus. On the other hand, when the turn-over cover 60 is in the open state, the turn-over cover 60 is energized to be opened by the helical torsion coil spring 81. Therefore, the recording/reproducing apparatus of the third embodiment eliminates the shaking movement in the turning of the turn-over cover 60, and can be operated in the concise and correct way with manual operation by the user.

As will be understood from the foregoing description, after finish of the loading operation in the while mechanism of the recording/reproducing apparatus, the recording/reproducing apparatus is of a compact size. In other words, since the second frame 23 is moved to the innermost space of the recording/reproducing apparatus, there is no redundant vacant space behind the tape guide drum 9. Therefore, after the loading posts 13, 14, 15 pass through the rear space of the tape guide drum 9, the tape loading mechanism for forming the tape path is configured to be received in an as small as possible space.

According tot he above mentioned recording/reproducing apparatus of the present invention, with regard to all the embodiments, the first frame 22 which supports the tape cassette 1 is slid in a direction to contact the second frame 23, thereafter it is further slid together with the second frame 23 in the same direction to be received in the recording/reproducing apparatus. Therefore the pace for forming the necessary tape path can be formed as small as possible. The recording/reproducing apparatus is extremely advantageous for the reduction of size.

With regard to all the embodiments of the recording/reproducing apparatus in accordance with the present invention, since the direction of loading the tape cassette 1 to the cassette guide mechanism of the first frame 22 can be selected to be in a single direction, the recording/reproducing apparatus of the present invention is advantageously incorporated to other apparatus, such as a portable VCR which needs to be as compact as possible.

In the third embodiment of the recording/reproducing apparatus in accordance with the present invention, since the first frame 22 and the second frame 23 are moved by the closing operation of the turn-over cover 60, the first frame 22 and the second frame 23 are slid by the manual operation of the user. Therefore, the recording/reproducing apparatus is dependable and economical.

Since the turning operation of the turn-over cover 60 of the third embodiment is finished after all of the movements of the cassette loading operation are finished, the locking operation for closing the turn-over cover 60 can be constructed independently to be operated after the cassette loading operation.

Further, since the turn-over cover of the third embodiment 60 is prevented from turning except when the first frame 22 approaches the second frame 23, the recording/reproducing apparatus is prevented from a break down due to a wrong operation by the user. Therefore, the recording/reproducing apparatus has a high reliability.

Further, in the third embodiment, the turnover cover 60 is energized in an opening direction during the opening of the turn-over cover 60, or in a closing direction during the shutting of it. Therefore, the opening or closing operation of the turn-over cover 60 is performed by the user, and the recording/reproducing apparatus is constructed to have a superior handling operation.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A recording/reproducing apparatus comprising:
    a first support means for supporting a tape cassette,
    a second support means for supporting a tape guide drum which has at least one rotary head,
    a third support means for supporting said first support means and said second support means,
    a first movement means which moves said first support means relative to said second support means in a first direction,
    a second movement means which moves said second support means relative to said third support means in said first direction, and
    a means for moving said first support means and said second support means together in said first direction after said first support means has been moving in said first direction.

2. A recording/reproducing apparatus in accordance with claim 1, wherein
    said first support means has thereon at least a portion of a tape driving means which drives a tape by rotating a reel in a tape cassette.

3. A recording/reproducing apparatus in accordance with claim 1, wherein
    said second support means has thereon at least a portion of a path-forming means which predetermines a tape path by means of drawing a tape from said tape cassette to outside of said tape cassette and winding it around said tape guide drum in a predetermined angle.

4. A recording/reproducing apparatus in accordance with claim 1, wherein,
    said third support means has at least one of said first movement means and said second movement means.

5. A recording/reproducing apparatus in accordance with claim 1, wherein,
    said first direction is a direction of inserting said tape cassette for loading into said recording/reproducing apparatus.

6. A recording/reproducing apparatus in accordance with claim 1, wherein
    said path-forming means is operated by said relative movement between said first support means and said second support means.

7. A recording/reproducing apparatus in accordance with claim 1 comprising:
    a spring means which pulls together said first support means and said second support means, for stopping said second movement means by a resilience of said spring means when said first support means is moved in said first direction relative to said second support means by said first movement means.

8. A recording/reproducing apparatus in accordance with claim 1, further comprising:
    a turn-over cover which tightly covers said third support means, said turn-over cover having a closing movement which slides said first support means and said second support means to be received in said third support means, and said turn-over cover having an opening movement which slides said first support means and said second support means to be projected from said third support means.

9. A recording/reproducing apparatus in accordance with claim 8, wherein
    said closing movement of said third support means by said turn-over cover is completed after said receiving of said first support means and said second support means in said third support means.

10. A recording/reproducing apparatus in accordance with claim 8, further comprising:
    an energizing means which energizes said turn-over cover closing movement, and said turn-over cover opening movement.

11. A recording/reproducing apparatus in accordance with claim 8, further comprising:
    a turning block means which prevents a turning of said turn-over cover except when said first support means approaches said second support means by said first movement means.

* * * * *